A. E. MUELLER.
MOTOR DRIVEN AEROPLANE.
APPLICATION FILED MAR. 27, 1907.

937,381.

Patented Oct. 19, 1909.
6 SHEETS—SHEET 4.

Witnesses:
S. D. Hirschl
T. H. Alfreds

Inventor:
A. E. Mueller
by Poole & Brown
Attys.

UNITED STATES PATENT OFFICE.

AUGUST E. MUELLER, OF CHICAGO, ILLINOIS.

MOTOR-DRIVEN AEROPLANE.

937,381. 		Specification of Letters Patent. 		Patented Oct. 19, 1909.

Application filed March 27, 1907. Serial No. 364,900.

*To all whom it may concern:*

Be it known that I, AUGUST E. MUELLER, a citizen of Argentina, and a resident of Chicago, in the county of Cook and State of Illinois, have invented certain new and useful Improvements in Motor-Driven Aeroplanes; and I do hereby declare that the following is a full, clear, and exact description thereof, reference being had to the accompanying drawings, and to the characters of reference marked thereon, which form a part of this specification.

This invention relates to improvements in motor-driven aeroplanes and consists in the matters hereinafter more particularly described and pointed out in the appended claims.

My invention may be better understood by referring to the accompanying drawings in which,—

Figure 4:
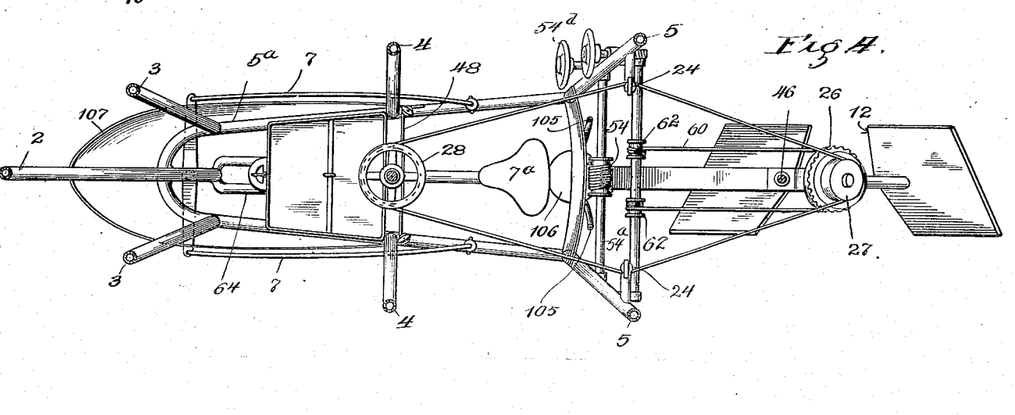
Fig. 4 is a horizontal section on the line 4—4 of Fig. 2.
Figures 5, 17:
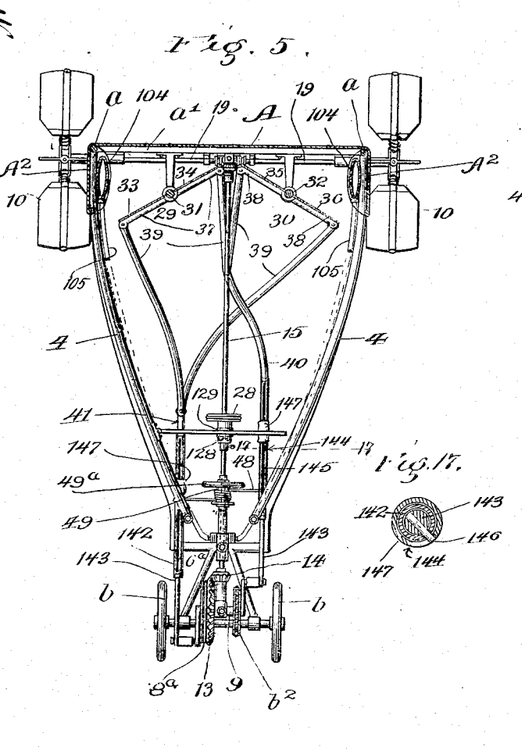
Fig. 5 is a transverse vertical section on the line 5—5 of Fig. 2.
Fig. 17 is a radial section on the line 17—17 of Fig. 5.

As shown in the drawings, the said aeroplane embraces a flat horizontally arranged aeroplane member A mounted on the upper part of a main frame carrying the operative parts of the machine. The aeroplane member, in plan view, is broadest at a place near its forward end, and from its broadest part it tapers to a point at the forward end and to a narrow tail portion $A^1$ at the rear end. From the widest part to a place near the rear end, the side margins of said aeroplane member are extended vertically downward to constitute vertical plane members $A^2$, as shown in Fig. 5, forming a space in which air is slightly compressed in the forward movement of the machine. Said aeroplane member may be made of cloth or other light fabric stretched over a frame consisting of marginal members $a$ $a$ and cross-members $a^1$ $a^1$, or it may be made of light sheet metal. The main frame, which may be made of bamboo, or ratan, or other light wood, or of metal tubes, comprises upright members 2, 3, 3, 4, 4 and 5, 5, best shown in Figs. 1 and 4, joined at their lower ends to horizontal members $5^a$, $5^a$, which latter constitute the top part of a sub-frame, indicated as a whole by $6^a$. The rear part of the aeroplane member is fastened to two diagonal frame members or braces 6, 6, joined at their lower ends to the frame members 5, 5. Said sub-frame $6^a$ is similar in form to an ordinary tricycle frame and is provided with two driving wheels $b$ and a steering wheel $b^1$, the former driven by means of a chain $b^2$ from a crank-shaft 9 described below, and the latter mounted in a steering fork of common form. By this means the machine may be propelled along the ground until sufficient speed is attained for the machine to be raised by the lifting action of the air on the aeroplane member A. No means are provided for stopping the rotation of the driving wheels $b$ when the other propelling devices, described below, are in operation, it being intended that during the machine's flight the wheels $b$ shall continue to rotate and serve as flywheels to steady the motion of the operative parts.

7, 7 indicate steering rods connected to the ends of a cross-bar on the upper end of the steering fork, leading to points within the operator's reach and provided at their rear ends with handles.

On the frame $6^a$ is mounted a saddle $7^a$ for carrying the operator. An engine 8 carried by the sub-frame is operatively connected by means of a belt $8^a$ to the crank-shaft 9 for driving the operative parts of the machine. To the crank-shaft 9 are connected a pair of cranks and pedals by means of which the operator may assist the engine by pedaling with his feet.

Figure 1:
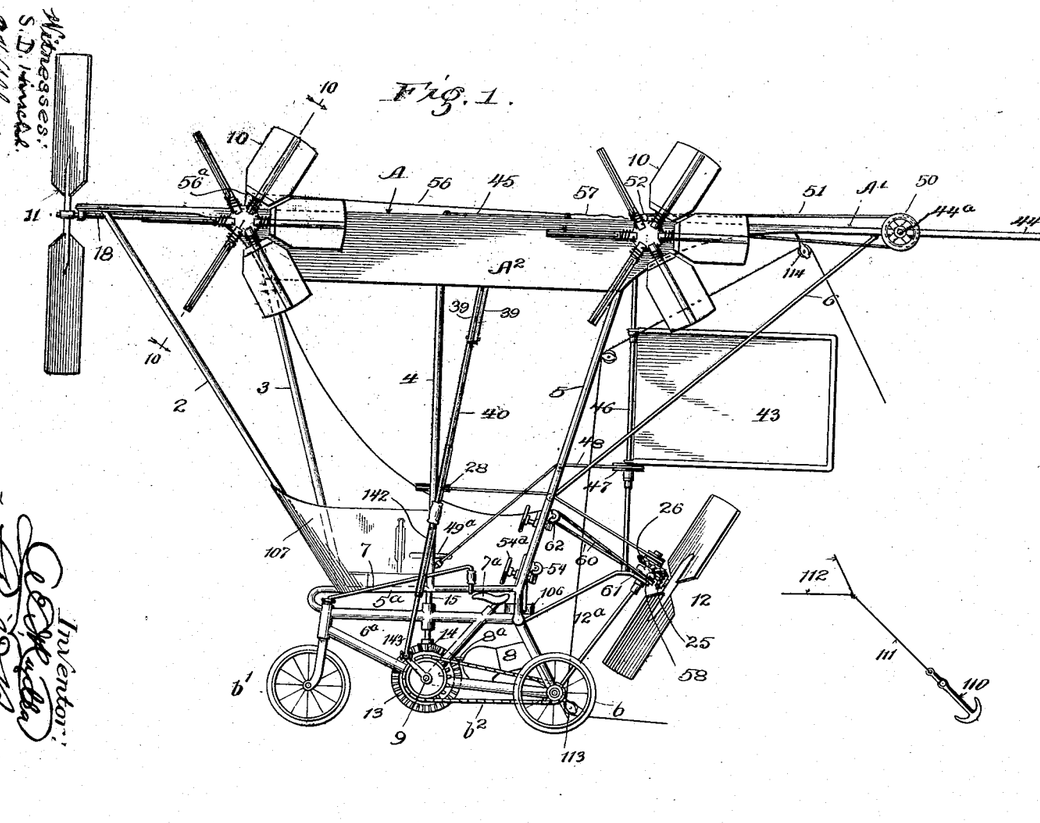
Figure 1 is a view in longitudinal elevation.
Figure 2:
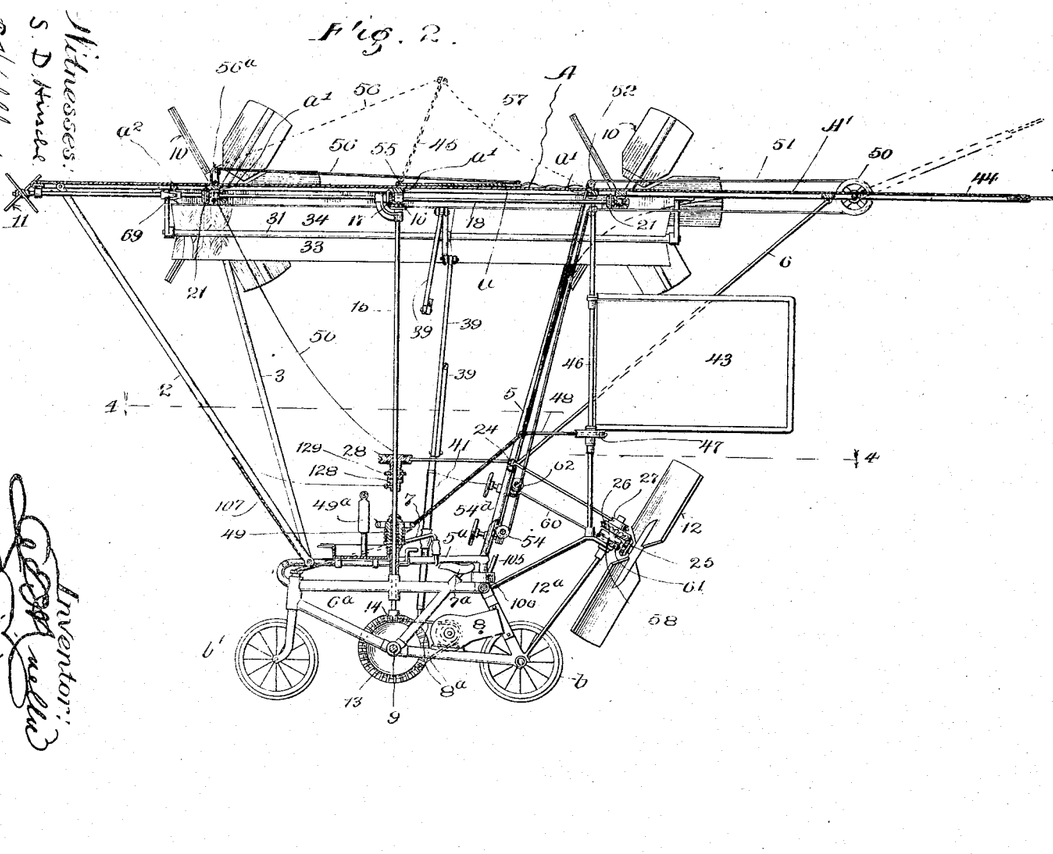
Fig. 2 is a longitudinal section on line 2—2 of Fig. 3.
Figure 3:
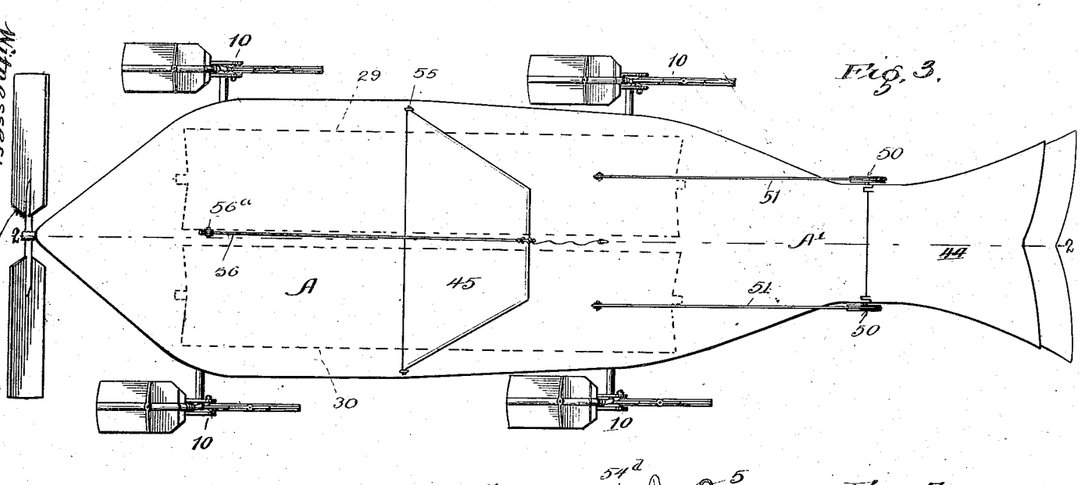
Fig. 3 is a top plan view.
Figure 8:
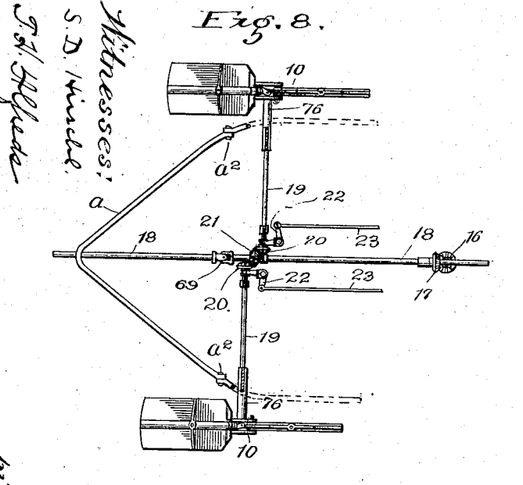
Fig. 8 is a plan view of the propeller shafts at the upper part of the main frame.

The propelling mechanism embraces four laterally facing propellers 10, 10, located two at each side of the aeroplane member A, and arranged in front and rear pairs, a transversely arranged propeller 11 at the forward end of the aeroplane member, and a transversely arranged, obliquely and downwardly facing propeller 12 located at the rear of the sub-frame 6ª. The propeller 12 is mounted on a bracket 12ª fixed to the rear part of the sub-frame 6ª (Figs. 1 and 2). Means for driving said propelled wheels are arranged as follows: 13 indicates a beveled driving gear non-rotatively connected to the main driving shaft 9 and meshing with a beveled pinion 14 on the lower end of a vertical rotative shaft 15. By means of a pair of beveled gears 16 and 17 (Fig. 8) the shaft 15 drives a longitudinally arranged horizontal shaft 18 located immediately below or substantially in the plane of the aeroplane member A. The propeller 11 is fixed to the forward end of said shaft 18. In rear of the propeller 11 are two transverse shafts 19, 19 carrying at their outer ends the forward pair of propellers 10, 10. The two shafts 19, 19 are provided at their inner or adjacent ends with bevel gears 20, 20, meshing respectively with the front and rear faces of a double faced bevel driving pinion 21 fixed to the shaft 18, by means of which the two shafts 19 are rotated in the same direction. The two bevel gears 20, 20 are non-rotative on, but slide endwise of, the shafts 19, 19, so that either or both of the gears 20, 20 can be shifted out of mesh with the double faced pinion 21. By this means the rotation of one of the propellers can be stopped while the other continues to rotate in order to facilitate turning the machine in a horizontal plane. The means for shifting the gears into and out of mesh with the double faced pinion consists of two bell-crank levers 22, 22 each connected at one end with one of the gears and at its other end with a reciprocating shifting bar 23. A similar connection is provided between the shaft 18 and the transverse shafts 19 of the rear pair of propellers. 25 designates a beveled gear non-rotatively fixed to the hub of the propeller 12. Said beveled gear meshes with a beveled driving pinion 26 fixed to or made integral with a pulley 27, driven by means of a belt from a pulley 28 mounted on the vertical shaft 15. Said belt runs over guide pulleys 24 carried by the frame member 5. The pulley 28 is adapted to slide longitudinally on its shaft 15 and is provided on its lower end face with notches or recesses forming one-half of a jaw clutch and adapted to engage with similar notches formed on the upper end face of a collar 128 fixed to the shaft 15. Said pulley is shifted on the shaft 15 to engage and disengage the clutch by means of a shifting fork 129. By this means the rotation of the rear propeller 12 can be stopped, when its aid is not needed, without stopping the rotation of the shaft 15.

In addition to the lifting action of the air on the aeroplane member A, the machine is designed to be raised by means of a pair of movable wings 29 and 30 arranged longitudinally immediately below the aeroplane member A. Each of said wings 29 and 30, here indicated in outline only, consists of a longitudinal rock-shaft 31 and 32, respectively, to which are fixed radially extending movable lifting planes 33 and 34, 35 and 36. The shafts 31 and 32 are provided with cranks 37, 38 connected by links 39 to the upper ends of connecting rods 40 and 41 which receive vertical reciprocatory motion from the cranks at the ends of the crankshaft 9, as best shown in Fig. 5. The parts are so arranged that the inner or adjacent planes 34 and 35 rise and fall together and alternately with the rise and fall of the outer planes 33 and 36. The structure of the planes 33, 34, 35 and 36 is such that resistance is opposed to their downward sweep through the air and the reaction of the air on the under surfaces tends to raise the machine, but on the upward sweep the air passes through them from the upper to the lower surface, thus affording no resistance to their upward sweep. For this purpose the said planes may be made by affixing to the rock-shafts 31 and 32 a sufficient number of wings from large birds to constitute the total area of lifting surface found necessary. Thus the desired results are obtained, inasmuch as the feathers in a bird's wings are so arranged that they oppose the passage of air through the wings in one direction but allow the air to pass freely therethrough in the other direction. The connecting rods 40 and 41 are each made of upper and lower members 142 and 143 connected by a joint 144 so arranged that said upper and lower members may be disconnected from each other in order to stop the motion of the wings 29 and 30 when the machine has risen to such height that their aid is no longer required. The upper member 142 of each of said rods 40 and 41 is tubular and the lower member 143 telescopes into the lower end of said tubular member.

145 indicates a longitudinal slot in the tubular member and 146 indicates a pin projecting radially from the member 143 and adapted to slide in the slot.

147 indicates a sleeve rotatively mounted between collars 148 on the tubular member and provided with a slot 149. Said sleeve is also provided with a circumferential notch 150 opening laterally into the slot 149 at a point midway of its length. When the sleeve is adjusted to bring its slot 149 in line with the slot of the tubular member the lower member slides freely in the upper tubular member and the pin slides in the slots without communicating motion to the tubular member. By adjusting the sleeve angularly on the tubular member, the pin may be engaged with the notch thereby transmitting reciprocatory motion to the upper tubular member 142. The outer surface of the sleeve is made in the form of a handgrip adapted to be easily grasped by the hand of the operator so that by alternately pushing and pulling on the rods 40 and 41 he can assist the action of the engine.

The means for steering and controlling the machine embrace a vertical rudder 43, a horizontal rudder 44 and a brake 45. The vertical rudder 43 is located somewhat below the aeroplane member A and is hinged at its forward end to a vertical rod or rudder shaft 46 extending upwardly from the rear propeller bracket 12$^a$ to one of the cross-members $a^1$ of the aeroplane member supporting frame. Said rudder 43 is provided with a hub to which is fixed a drum 47. Tiller ropes 48 are attached to said drum and lead therefrom and are wound in opposite directions around a drum 49 operated by a hand-wheel 49$^a$.

Figures 6, 7, 18:
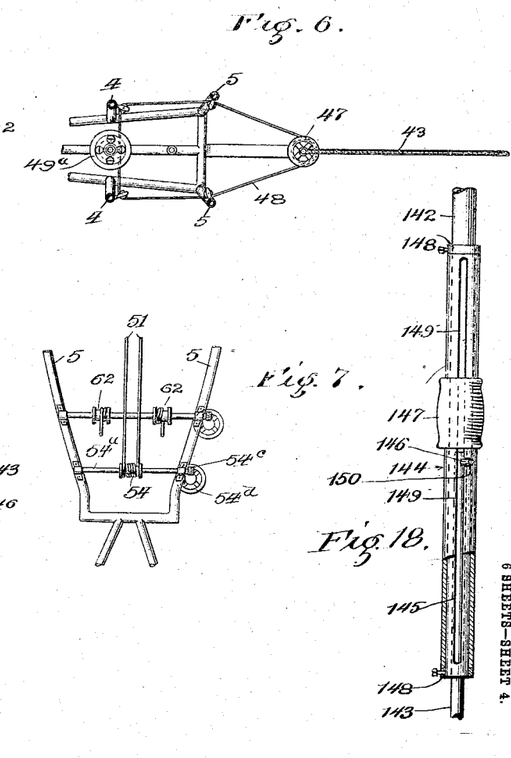
Figs. 6 and 7 are detail views showing the arrangement of the ropes for controlling the steering apparatus.
Fig. 18 is a detail view in elevation of one of the slip joints shown in Fig. 5.

The horizontal rudder 44 in plan view is shaped like a fish's tail and its forward edge is hinged to a horizontal rudder shaft 44$^a$ (Fig. 1) at the rear margin of the aeroplane member A. The rudder 44 is operated by means of a pair of drums 50, 50 fixed to its hub and ropes 51, 51 leading over pulleys 52, 52 at the upper ends of the vertical members 5 of the main frame, to a drum 54. The shaft 54$^a$ to which said drum 54 is fixed is rotated to operate said horizontal rudder by means of a worm gear device 54$^c$ operated by a hand-wheel 54$^d$ (Figs. 1, 2 and 7).

The brake 45 consists of a flat plane of considerable area carried normally horizontal above the aeroplane member A. It is designed to be raised into a vertical position, in order to present its surface to the resistance of the air and thus oppose the forward movement of the machine. For this purpose the said brake 45 is hinged at its forward margin to a cross-bar 55 mounted upon the upper surface of the aeroplane member A and is provided at its rear margin with a rope 56 leading over a pulley 56$^a$ near the forward end of the machine and thence to a point within the operator's reach. By pulling on the rope 56 the brake may be raised into the position shown in dotted lines in Fig. 2 thus presenting its surface to the air in a manner to retard the movement of the machine, as above described. 57 indicates another rope also attached to the rear margin of the brake plane but leading toward the rear of the machine by means of which the brake may be drawn back into its inoperative position.

Figure 9:
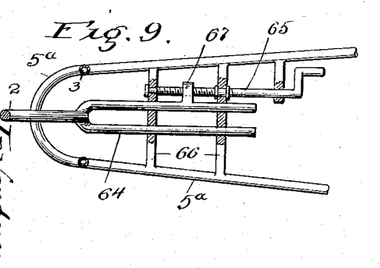
Fig. 9 is a detail plan view of a portion of the subframe of the machine.

As a further means of controlling the direction of flight of the machine, the shaft carrying the propeller 12 may be adjusted angularly about an axis transverse to the axis of rotation of the propeller thus causing the propeller 12 to exert a side thrust upon the rear end of the machine. For this purpose, the shaft on which the propeller is mounted is carried by or formed on a rotative collar 58 mounted on an upright, rearwardly inclined spindle 59 at the upper end of the bracket 12$^a$, and on which the gear 26, constituting part of the propeller power transmitting mechanism, is mounted (Figs. 1 and 2). The rotative collar 58 is provided with a drum 61 and with ropes 60, 60 leading to drums 62 by means of which the rotative bracket 58 can be adjusted angularly about its spindle. As a further means of changing the angle of inclination of flight with respect to the horizontal, the forward part of the aeroplane member A is designed to be tilted upwardly or downwardly. For this purpose the side members $a$ of the frame of the aeroplane member are jointed, as shown at $a^2$, so as to permit the forward ends of the frame to swing upwardly and downwardly, and the shaft 18 carried thereby is provided in alinement therewith with a universal joint (b). The upper end of the frame member 2 is pivotally connected with the forward end of the swinging portion of the aeroplane member and is pivotally connected at its lower end to the closed end of a slide frame 64 slidably mounted in the sub-frame 6$^a$ (Fig. 9). The said slide frame is adjusted endwise by means of a screw-shaft 65 rotatively mounted in cross-members 66 of the sub-frame which extends through and has screw-threaded engagement with a lug 67 extending laterally from the slide frame. The screw-shaft is provided with a crank-handle by which it is rotated to adjust said slide frame.

Figure 10:
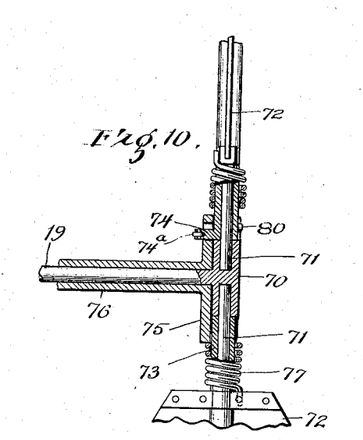
Fig. 10 is a radial section through one of the driving propellers on the line 10—10 of Fig. 1.
Figure 11:
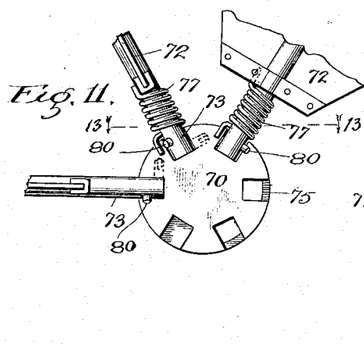
Fig. 11 is an enlarged detail elevation of the center portion of one of said propellers.
Figure 12:
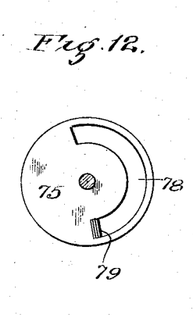
Fig. 12 is a side view of one of the cam disks detached from the machine.
Figure 13:
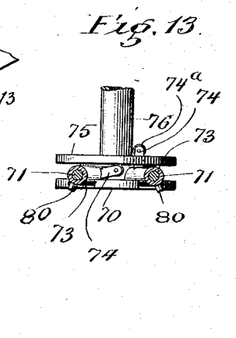
Fig. 13 is a section on the line 13—13 of Fig. 11.

Referring to the construction of one of the propellers 10, all of which are alike, 70 indicates a hub fixed to the end of one of the shafts 19 and provided with radial arms 71 on which are rotatively mounted the propeller blades 72. The blades 72 are designed to be rotated through an angle of 90° on their said arms 71 in order to present their flat surface forward during approximately one-half of the revolution of the propeller and exert their full force to drive the machine forward and upward; but present their edges forward during the remaining part of the revolution. As best shown in Figs. 10, 11, 12 and 13, each blade is non-rotatively fixed to a sleeve or blade-arm 73 rotatively mounted on one of the arms 71. 74 indicates a short lug projecting radially from the sleeve 73 and provided at its outer end with a roller 74$^a$ engaging with the lateral face of a cam disk 75 on the end of a sleeve 76 surrounding the shaft 19. Said sleeve 76 is secured to one of the frame members *a* of the aeroplane member and constitutes a bearing for the outer end of the shaft 19 as well as a support for the cam disk 75. The cam disk 75 is located closely adjacent to the hub 70 and in a plane normal to the shaft 19. The lug 74 is pressed into engagement with the face of the disk 75 by means of a volute spring 77 surrounding the blade arm and tending to rotate the blade 72 about its axis. The disk 75 is provided with a circumferential slot 78, of a length approximately 180°, located in the path described on its face by the lug 74. When the lug 74 in its travel over the face of the disk 75 reaches one end of the slot 78, said lug is swung into the slot, and the blade arm rotated to change the angle of the blade, through the action of the spring 77. When the lug 74 reaches the opposite end of the slot it is swung out of the slot against the action of the spring 77 into position to travel upon the face of the disk 75, thus restoring the blade to its first position. To facilitate this operation, the latter end of the slot is formed with an end wall 79 beveled from the back of the disk to its face, and the lug is provided with the antifriction roller 74ᵃ. When the blades are in the position in which the lug 74 engages with the face of the disk, they are prevented from rotating in one direction by the engagement of said lugs and disk and in the other direction by the engagement of said lugs with the inner face of the hub 70. A pin 80 on the radial blade arm limits the extent of rotation of said arm and blade when the lug 74 occupies said slot, as shown in Figs. 10, 11 and 12. The parts are so arranged that the blades will be opened and their flat surfaces turned forward by engagement of the lugs 74 with the beveled end wall 79 of the cam, and will close and be turned with their edges forward under the influence of the springs 77.

Figures 14, 15, 16:
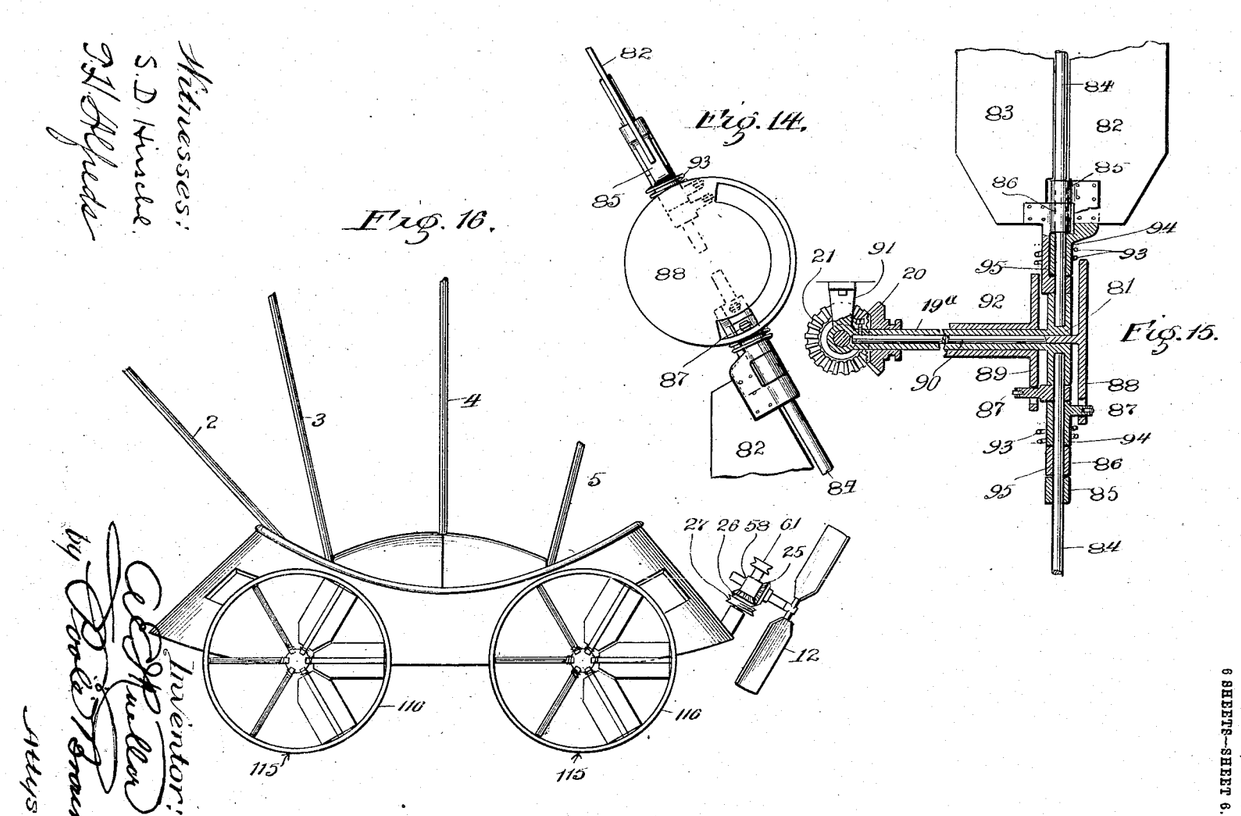
Fig. 14 is a detail side view of the center portion of a driving propeller of modified form.
Fig. 15 is a radial section thereof.
Fig. 16 is a view in side elevation of the lower part of a machine of modified form.

As a modification of the propellers with movable blades above described, I have shown in Figs. 14 and 15, a propeller in which the blades are designed to fold along lines extending radially from the hub 81 thereof. As herein shown, each blade consists of two parts or blade members 82 and 83 hinged on the associated radial arm 84 by hinge lugs 85 and 86 provided with radial lugs 87 engaging with the adjacent faces of two stationary cam disks 88 and 89 located one laterally outside and the other inside of the hub 81. In this construction, the driving shafts 19ᵃ, 19ᵃ are hollow and the outer cam disks 88 are fixed on the outer ends of non-rotative shafts 90 extending into and through the hollow driving shafts. The said shafts 90 are non-rotatively fixed at their inner ends in brackets 91 depending from the frame of the aeroplane member. The inner cam disks 89 are fixed to sleeves 92 surrounding the driving shafts 19ᵃ and carried by the aeroplane member. The hinge lugs 85 and 86 include two sleeves 94 and 95, respectively, engaged by opposite ends of a volute spring 93 tending to rotate the hinge lugs in opposite directions and fold the two parts 82 and 83 of each blade together along their axes 84. The two disks 88 and 89 are provided with circumferential slots, as above described, designed to allow the lugs 87, 87, respectively, to enter and fold the blades together; and with end walls designed to guide the said lugs 87, 87, respectively, onto the faces of the disks and cause the blades to open.

104, 104 indicate two gas bags located immediately below the aeroplane member A at the side margins thereof, and connected by means of tubes 105 to a gas tank 106 mounted in the frame 6ᵃ. Said gas tank is filled with calcium carbid and is provided with perforations in its lower part, the whole constituting an acetylene gas generating apparatus which will inflate the gas bags with acetylene gas should the gas tank be submerged in water by the falling of the machine into water. The gas bags 104 are of such size that when inflated they will sustain the weight of the machine in the water.

107 indicates a curved wind-shield made of glass or other transparent material and secured to the forward part of the sub-frame 6ᵃ.

In the ordinary operation of my device, a flight will be started by propelling the machine along the ground until sufficient speed has been attained for it to be raised by the lifting action of the air on the aeroplane member. Under the action of the propellers 10, 10, 11 and 12 the machine will continue to move forward and will rise in a path inclined at a small angle to the horizontal. This method of rising is not available when, in order to clear obstacles, it is necessary to rise in a path inclined at a large angle to the horizontal. In such cases it is intended to hold the machine captive at the end of a rope and, by operating the propelling devices, cause it to ascend on an arc described about the point of attachment to the ground as a center. 110 designates an anchor by means of which the machine is designed to be so held captive. Said anchor is attached to a rope 111 which is joined at its upper end to both ends of a rope 112 which runs over pulleys 113, 114 located respectively at the rear of the sub-frame 6ᵃ and at the rear margin of the aeroplane member A. It is intended that the operator shall fasten the anchor in the ground and, by operating the propellers and wings, cause the machine to rise on an arc described about the point of attachment to the ground as a center. During the rise of the machine, the change of angularity of the rope 111 with the horizontal will cause the shank of the anchor to be rotated about its point of attachment with the ground until its blade becomes disengaged from the ground. In said rise, the rope 112 will shift its position over the pulleys 113 and 114 so that the pull will always be in a direction tending to keep the machine horizontal.

In Fig. 16 I have indicated in outline a form of construction in which the frame 6ᵃ is replaced by a car designed to accommodate several passengers. In a machine of this description, the three traction wheels are replaced by four propeller wheels 115, similar to the propeller wheels 10, but provided with rims 116 which are adapted to run on the ground at the beginning of the machine's flight. These propeller wheels 115 are provided in addition to the propellers 10, 11 and 12 above described. The car is designed to serve as a boat when it is desired to operate the machine on the water. In such case the propellers 115 would be submerged, and they are as well adapted to propel the machine through water as through air. The motor and operative parts connecting it with the propellers 12 and 115 are concealed in the car.

I claim as my invention:—

1. In a motor driven aeroplane, an aeroplane member provided at its side margins with vertical planes and a swinging wing located beneath said aeroplane member between said vertical planes.

2. In a motor driven aeroplane, an aeroplane member provided at its side margins with vertical planes and a swinging wing located beneath said aeroplane member between said vertical planes, said aeroplane member tapering toward its rear end.

3. In a motor driven aeroplane, a movable wing including a rock-shaft, a crank and a connecting rod consisting of a lower member and an upper member, one of said members being tubular at its end to receive the other member, and means for engaging said upper member with said lower member constructed to lock said members together or to permit said members to slide relatively to each other at their engaging ends for the purpose set forth.

4. In a motor driven aeroplane, an anchor and an anchor rope, and a rope trained over pulleys at the upper part and at the lower part, respectively, of said aeroplane, and attached to said anchor rope.

In testimony, that I claim the foregoing as my invention I affix my signature in the presence of two witnesses, this 14th day of March A. D. 1907.

AUGUST E. MUELLER.

Witnesses:
A. M. BUNN,
T. H. ALFREDS.